March 11, 1941. E. J. HOUDRY ET AL 2,234,169
CONVERTER AND FLUID MANIFOLDING DEVICE THEREFOR
Filed Aug. 15, 1934 3 Sheets-Sheet 1

INVENTORS
Eugene J. Houdry and
Raymond C. Lassiat
BY
Ira L. Nickerson
ATTORNEY.

March 11, 1941.   E. J. HOUDRY ET AL   2,234,169
CONVERTER AND FLUID MANIFOLDING DEVICE THEREFOR
Filed Aug. 15, 1934   3 Sheets-Sheet 2

WITNESS:

INVENTORS
Eugene J. Houdry
Raymond C. Lassiat
BY
Ira L. Nickerson
ATTORNEY.

March 11, 1941.   E. J. HOUDRY ET AL   2,234,169
CONVERTER AND FLUID MANIFOLDING DEVICE THEREFOR
Filed Aug. 15, 1934   3 Sheets-Sheet 3

WITNESS:

INVENTORS
Eugene J. Houdry and
Raymond C. Lassiat
BY
Ira L. Nickerson
ATTORNEY.

Patented Mar. 11, 1941

2,234,169

UNITED STATES PATENT OFFICE 2,234,169

CONVERTER AND FLUID MANIFOLDING DEVICE THEREFOR

Eugene J. Houdry, Philadelphia, Pa., and Raymond C. Lassiat, Woodbury, N. J., assignors to Houdry Process Corporation, Dover, Del., a corporation of Delaware Application August 15, 1934, Serial No. 740,024

7 Claims. (Cl. 23—288)

This invention relates to the delivery of fluids especially in connection with fluid conducting members of the manifolding type. It is particularly directed toward corrosion and/or erosion resisting throttling means for apparatus of the type described. One aspect of the invention lies in the application of said throttling means in fluid distributing manifold or atomizing means serving a chamber which may or may not contain a contact mass and in which a chemical reaction may or may not be effected. The fluid may be distributed within a contact mass or outside a body of the mass and directed toward or away from the mass; or the fluid may be delivered within a chamber and distributed therethrough or through a portion thereof in finely dispersed form as for heat exchange, mixing, scrubbing, or the like. Another aspect of the invention lies in the application of said throttling means to maintain, without substantial change, predetermined distribution from a fluid delivery system containing a plurality of delivery ports any or all of which may be delivering the same or differing amounts of fluid. From another aspect, the invention is an improvement and development of the fluid distributing plug disclosed in the copending application of Eugene J. Houdry, Serial No. 611,363, filed May 14, 1932, now United States Patent No. 1,987,904, issued January 15, 1935.

One object of the invention is to control the flow of the fluids to or from a fluid manifolding system. Another object is to provide an economical fluid distributing system containing a plurality of discharge ports capable of maintaining a predetermined flow of fluid from any or all of said ports without substantial change because of the corrosive and erosive effects of the fluid. Another object is to provide corrosive and/or erosive resistant throttling means capable of insertion into and removal from a fluid discharging device. Still other objects will be apparent from the following detailed description.

The invention contemplates perforated inserts, such as plaques or buttons fabricated from corrosion and/or erosion resistant material, mounted in an element such as a conduit, coil, manifolding chamber, partition or the like for the purpose of controlling flow of fluids into or from the element. The inserts may be fastened in a perforation in the element in any known manner, such as by driving, peening, screw threads, or the like, welding, brazing, etc., that will provide a fluid tight engagement in said perforation. The buttons in any given fluid delivery system of the types described may all have the same or substantially the same size perforation, or any one may differ from any or all the others, according to the distribution of fluids desired.

It is sometimes desirable to deliver and/or collect fluids simultaneously and uniformly throughout the length and breadth of a chamber, which may or may not contain a contact mass, or at predetermined distribution rates in certain parts of the chamber. The corrosion and/or erosion effects of the fluids being delivered and/or collected tend to enlarge the distributing orifices or ports in the distributing member. It has been found that in a distributing and/or collecting system the individual units of which contain ports of the same size all of the ports do not enlarge and change shape to the same degree, and, in a system the individual units of which contain different size ports, the smaller ports gain in percentage increments of area much more rapidly than the larger ones. Similarly, the same facts are generally true in fluid distributing elements designed to deliver fluids in a single plane.

One application of the present invention is in a fluid delivery system serving a multiplicity of points in a plurality of planes in a chamber. The distributing element may or may not be embedded in a contact mass. Similarly, the inserts may be employed in a fluid distributor delivering fluids in a single plane. In either case, the buttons minimize the improper distribution from the fluid delivery members caused by corrosion and/or erosion in the discharge ports thereof. They are capable of long and continuous service in distributors delivering hot or cold corrosive fluids at high velocities. They may be used in fluid distributing members which also serve as means for intimately mixing fluids or for the delivery of one fluid to a chamber to be mixed with another fluid already therein or being delivered thereto, or in distributing members delivering fluids to a contact mass or for the purpose of agitation, chemical reaction, heat exchange or the like.

Aside from the advantages in maintaining predetermined distribution rates from a fluid distributing member, the buttons provide further advantages in utility and economy. They usually are fabricated from costly materials such as special metal alloys. Comparatively small amounts of the alloy are used in making a large number of the buttons, and they are of such simple design that their production costs are low. On the other hand, a distributing member fashioned entirely of alloy metals is extremely costly. The useful life of such a member would be limited to the period of time during which the predetermined distribution of fluids therefrom would remain substantially unaffected by corrosion and/or erosion of the ports therein. It is well known that in manifolding devices of the type described the corrosive and erosive effects are accentuated in the regions where the velocity of the fluids is increased. A distributing member fabricated from known and more common materials, such as iron, steel, aluminum, or the like, and provided with the special alloy buttons, not only has the advantages of lower initial cost, but when the buttons have become corroded and/or eroded to such an extent that distribution is upset, they may be replaced by new buttons. In this manner, a distributing member may have a life equal to that of several of the inserts or buttons.

One adaptation of the buttons is in fluid delivering and collecting or outlet conduits embedded in a contact mass suitable for catalytic transformation of high or low boiling hydrocarbons into anti-knock gasoline, or for the stabilization and/or purification of gasolines, naphthas and the like, or for the treatment of lubricating stocks or the like. In apparatus of this type, the conduits may serve the additional function of distributing and/or collecting regenerating fluids to or from the mass. In some instances, the conduits may serve only as distributing and/or collecting members for regeneration fluids to purge the contact mass of coky and other contaminants deposited thereon.

Another adaptation of the buttons is in a distributing element delivering fluids in a single plane as over or within a contact mass, for example, as in the vaporization of hydrocarbons where a contact mass is used, or in catalysts such as synthesis of ammonia, oxidation of sulphur dioxide and organic catalytic oxidation, synthesis of alcohols, etc.

The buttons are also applicable in other contact and mixing chambers which do not contain contact masses, for example, in elements supplying fluids to a gas scrubbing or saturating chamber, or in elements supplying refluxing material to a fractionating column.

Another practical use of the invention is in fluid mixing devices or in distributors which serve to agitate a fluid in a chamber as fluid distributors in conventional oil treating devices and in solvent refining equipment. The buttons may also be used in fluid mixing devices in which reactants are intimately mixed before delivery to a catalytic or other reaction chamber, for example in the synthesis of ammonia, oxidation of sulphur dioxide, or the like.

Concrete embodiments of the invention are shown in the accompanying drawings, in which.

Figure 1:
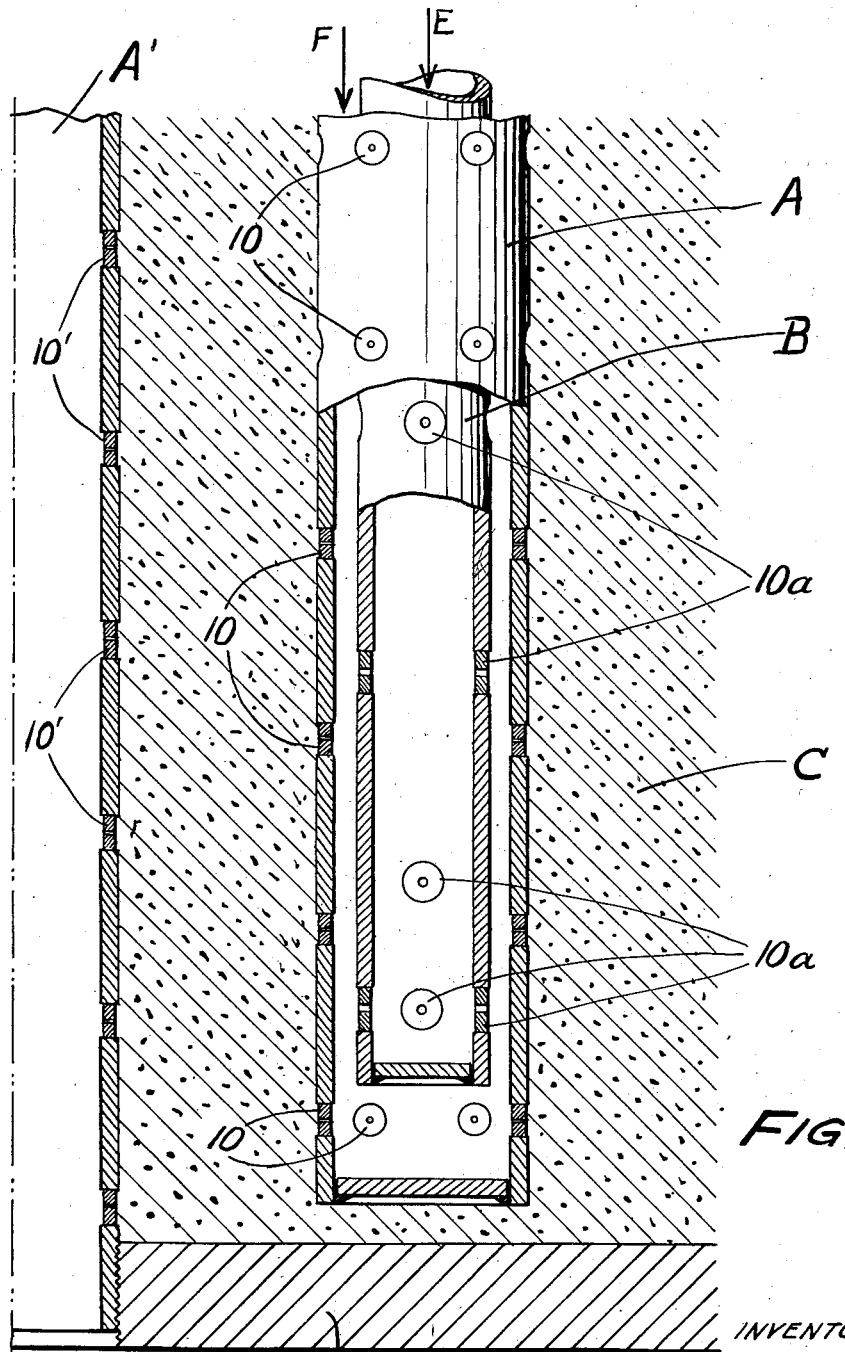
Fig. 1 is a fragmentary sectional view of a portion of a converter showing a fluid conduit unit partly in section and partly in elevation and a fragmentary sectional view of a portion of a second conduit in spaced relation thereto, each being embedded in a contact mass.
Figure 2:
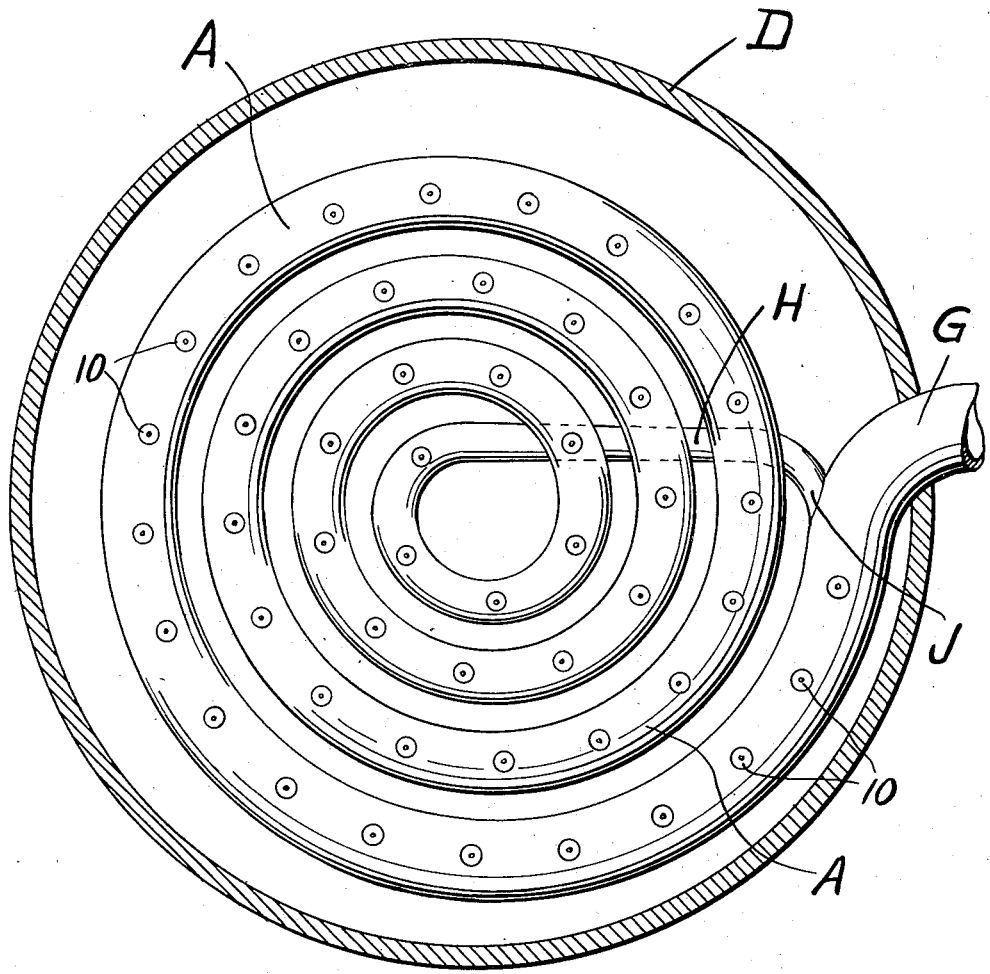
Fig. 2 is a plan view of a fluid distributing or outlet member disposed in a chamber or reaction vessel.
Figure 6A:
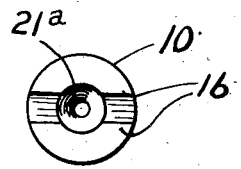
Figure 6:
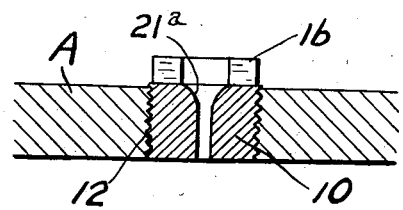
Figure 9A:
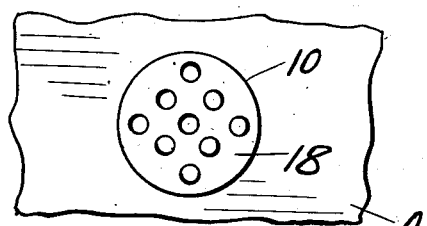
Figure 9:
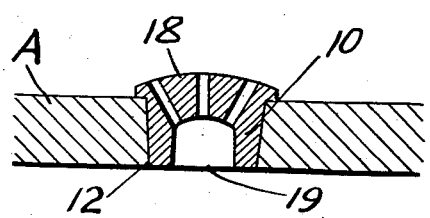

Figs. 4, 5, 6, 7, 8, and 9 are partial sectional elevational views in larger scale than Figs. 1 and 2 of walls of fluid distributing or collecting elements such as those shown in those figures or any known fluid manifolding member, illustrating several forms of buttons and methods of mounting the same;

Figs. 6a and 9a are plan views of Figs. 6 and 9, respectively.

In Fig. 1, conduits A and B in nested arrangement form a unit serving to distribute fluids to contact mass C in which it is embedded. The unit may be one of several embedded in mass C. Conduits A and B have ports in the walls thereof in which are inserted buttons 10 and 10a, respectively to lie entirely within a projection of the walls of said conduits. D represents a portion of a wall of the vessel containing mass C and the units. The units serve to distribute fluids simultaneously throughout mass C when fluids are admitted to inner member B as at E or at E and F. In the latter instance, the unit performs the function of a mixing chamber as well as serving as a distributing member. In spaced relation with the unit comprised of nested conduits A and B is another conduit a portion of which is indicated at A', having buttons 10' in the walls thereof. This conduit serves as an outlet member for fluids distributed from the nested unit and dispersed throughout the mass after the manner described in the copending application of Eugene J. Houdry, Serial No. 611,362, filed May 14, 1932, for improvements in Fluid Distribution in Contact Masses which issued on June 2, 1936, as Patent No. 2,042,468. Conversely, conduit A' may serve as a distributing member and the nested unit as an outlet member.

In Fig. 2, the fluid distributing member is in the form of a coil such as A which has perforations therein at predetermined intervals. Buttons 10 are inserted in the perforations. Coil A is disposed in a vessel defined by shell or wall D. This type of distributor is adapted to deliver fluids from substantially a single plane to or upon a contact mass or within a reaction chamber or other vessel. The coiled delivery system A is particularly well adapted to deliver fluids in any predetermined distribution relationship. The distribution from the coil is a function of the placement of the buttons, the size of the orifices therein, and the pressure differential between the interior and exterior of the coil. The coil A feeds back through extension H to a point J adjacent the entrance G to the element. Thus, fluid is at constant pressure throughout coil A. Coil A is also shown as decreasing in diameter in the direction of flow in order to maintain a substantially constant velocity of fluids flowing therethrough and to minimize the volume of fluids in the coil during its operation.

Figure 3:
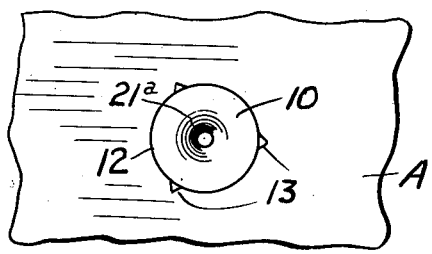
Fig. 3 is a plan view on a larger scale of a portion of the wall of the fluid manifolding members shown in Figs. 1 and 2 or of any known manifolding device illustrating a button and its mounting.
Figure 4:
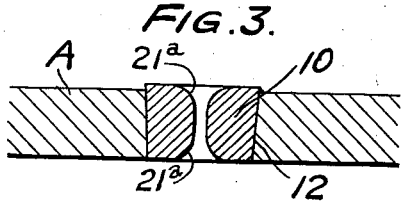
Figure 5:
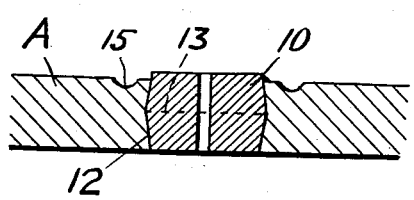
Figure 7:
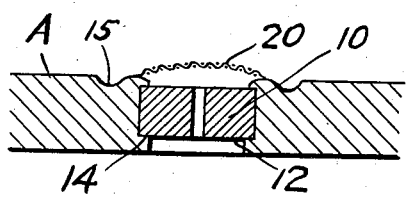
Figure 8:
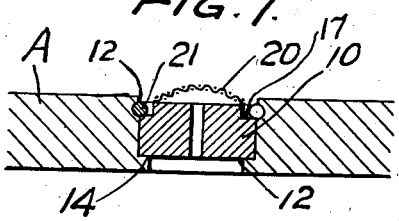

Fig. 3 illustrates a button 10 of the type described, fitted in a perforation, such as 12, in wall A of a fluid delivery member, and spot welded as at 13 to hold it firmly in place. In Fig. 4, button 10 having tapered sides is driven into perforation 12 of distributing member wall A to be substantially completely contained within perforations 12. Fig. 5 embodies a button 10 having double-tapered sides forming ridge 13, driven into perforation 12 of wall A, and held firmly in place by cold molding of the metal, as by peening, shown at 15. In Figs. 6 and 6a, button 10, having threads thereon, is screwed into threaded perforation 12 of wall A, purchase on the button being obtained, in the known manner, by a wrench on ears or lugs 16. Fig. 7 illustrates a slightly different form of button and the manner of its fastening, in which the perforation 12 in distributing wall A is counterbored to provide shoulder 14 against which button 10 is forced. The button is shown held in place by peening as at 15. Fig. 8 illustrates a button 10 having a cut-away portion forming a ledge or shoulder 17 for the purpose of providing a space for laying down a welding bead to hold the button firmly and solidly in place, or for the insertion of a spring clip, such as 21, a driven collar or the like to hold button 10 in place but providing convenient removal and insertion thereof in perforation 12.

It is well known that when fluids carrying suspended material therein are caused to alter their course of flow, particularly suddenly, the suspended material, whether it be solid in a liquid or gaseous stream or suspended droplets in a gaseous stream, tends to separate from the carrying medium at the point of change of direction. The inserts 10 shown in Figs. 3, 4, 6 and 6a have flared portions 21a in the passages formed by the perforations therein. These flares may open into or away from the interior of a manifolding member in which the inserts are mounted, but preferably are directed against the direction of the fluid stream, i. e., toward the interior of a manifold serving as a distributing member or toward the outer surface of a fluid collecting member. They serve to avoid or to minimize the deposition of suspended material at the fluid entrance to the insert by causing the change in direction of that portion of the fluid stream flowing therethrough to be gradual. In this manner inserts having flared perforations therein tend to keep clean longer than those with uniform perforations. In some instances, it is preferable to employ inserts having perforations both ends of which are flared as shown in Fig. 4. Although a straight flare may sometimes be used, in most instances it is preferable, as indicated, progressively to increase the size of the perforation in the insert in such a manner that there are no sharp edges or ledges on the inner surface of the bore which would cause abrupt change in the direction of fluid flow.

Among many examples of the utility of inserts having flared passages for minimizing or avoiding deposits in the nozzle openings may be noted the handling of hydrocarbon vapors and/or gases. They are particularly well adapted for use in manifolding members of the types disclosed in Figs. 1 and 2 when handling hydrocarbon vapors or any fluid of the type described. While the inserts disclosed in these figures are shown, for simplicity and convenience, as having straight bores, it is to be understood that best results are obtained in many instances by the use of flared bores. For example, in Fig. 1, the inserts 10a in inner conduit B would have inserts with the doubly flared bore such as disclosed in Fig. 4, by reason of two changes in direction of the fluid on entering and leaving the inserts, but the inserts 10 in outer member A need have flared inlets such as 21a to the bore only at their inner ends, i. e., toward inner conduit B. The inserts 10' should have flared bores toward contact mass C and straight or flared bores on the inside, as desired. The inserts with doubly flared perforations or bores such as shown in Figs. 3 and 4 are especially suitable in any manifold which has the alternative or occasional functions of both an outlet and a distributing member.

In Figs. 7 and 8, 20 represents a foraminous screen attached to the outer face of button 10 to preclude contact mass from the perforations in said buttons when the contact mass is in comminuted form or in the form of molded bits or fragments having one dimension smaller than the bore in said button. The types of buttons shown in Figs. 7 and 8 may approach thin plate orifices in character, and, as shown, are held in place within the wall of the manifolding member.

The screens 20 associated therewith may be used in connection with any forms of button shown.

Figs. 9 and 9a illustrate a button 10 having a curved outer face 18 and a plurality of perforations therein to provide a spraying effect in delivering fluids from a fluid delivery element having a wall A. The perforations may have axes lying along radii of face 18. Similarly, the screens 20, shown in Figs. 7 and 8, provide substantially the same spraying effect realized from buttons of the type shown in Figs. 9 and 9a. Arched manifolding space 19 is provided to cut down the resistance to flow of fluids through the perforations in the button and to provide substantially equal length of fluid path. Manifolding space 19 may serve also as means for insertion of a tool therein to spread the end of the button and thereby to fasten it to the manifold wall.

Any desired combination of the forms disclosed in the drawings lies within the scope of the invention.

It has been found, in the catalytic cracking or other treatment of hydrocarbons, such as petroleum or the like, that buttons made of the general class of steel alloys known as 18–8 (18% chromium and 8% nickel), as well as other chromium steels and other corrosion and/or erosion resistant alloys, provide long life of fluid distributing or collecting elements when used therewith, and provide the additional advantage herein described. Certain of the vanadium or molybdenum steel alloys are efficient for use in buttons for ammonia synthesis apparatus. Other metal alloys having the desired properties, each chosen according to the conditions of temperature and the type of fluid being handled, are known to the industry and may be employed in the means lining the ports in any fluid delivering or collecting element of the class described.

The invention claimed is:

1. In combination, a converter providing a reaction chamber for effecting a contact or catalytic treatment of fluids, a plurality of conduits comprising induction and eduction conduits for fluid reactants and fluid products of reaction extending within said reaction chamber in substantial parallelism and adapted to be embedded in a bed of contact material, said conduits having perforations or openings in spaced relation throughout the length thereof for the introduction and withdrawal of fluids, and corrosion and erosion resistant means lining the surfaces of said openings in both the said induction and eduction conduits, so as to restrict to predetermined extent the size of each of said openings thereby to provide for predetermined passage of fluid therethrough and to maintain substantially constant the predetermined size of said openings and the uniform movement of fluid through all portions of said contact material with extensive use of the apparatus.

2. In combination, a converter providing a reaction chamber for effecting a contact or catalytic treatment of fluids, a series of induction conduits and a series of eduction conduits extending within said reaction chamber in interspersed and substantially symmetrical and parallel relation and adapted to be embedded in a bed of contact material, said conduits of both series having perforations or openings in the walls thereof, said perforations or openings being spaced from each other along the lengths of said conduits and arranged to provide for substantially uniform introduction of fluids into and withdrawal of fluids from all portions of the contact material, and corrosion and erosion resistant inserts mounted in said openings, each said insert having at least one perforation of predetermined size, thereby to establish and to maintain the predetermined uniformity of movement of fluid through all parts of the bed of contact material with extensive use of the apparatus.

3. In combination, a converter providing a reaction chamber adapted to contain a contact or catalytic mass, a plurality of conduits comprising induction and eduction conduits for fluid reactants and fluid products of reaction extending within said reaction chamber in substantial parallelism and adapted to be embedded in the contact mass, said conduits having spaced perforations or openings in the walls thereof for effecting substantially uniform introduction of fluids into and substantially uniform withdrawal of fluids from each unit volume of said reaction chamber, corrosion and erosion resistant means lining the surfaces of at least those openings for the introduction of fluid into said reaction chamber, and foraminous or screen-like members mounted over said perforations or openings to hold contact or catalytic material away from said perforations or openings and from the walls of the conduits surrounding said openings so as in effect to provide chambers along the walls of the conduits adjacent said perforations or openings of much greater extent than the dimensions of each of said openings in order to increase substantially the surface through which fluid commences diffusing through the contact or catalytic mass or from which it leaves such mass so as substantially to eliminate non-uniformity of flow through various portions of the reaction chamber because of variations in the porosity of the small section of contact mass directly over each perforation or opening.

4. In combination, a converter providing a reaction chamber for effecting a contact or catalytic treatment of fluids, a series of induction conduits and a series of eduction conduits extending within said reaction chamber in interspersed and substantially symmetrical and parallel relation and adapted to be embedded in a bed of contact material, said conduits of both series having perforations or openings in the walls thereof spaced from each other along the lengths of said conduits and arranged to provide for substantially uniform introduction of fluids into and withdrawal of fluids from all portions of the reaction chamber containing catalytic material, corrosion and erosion resistant metal alloy inserts mounted in said openings, each said insert having at least one perforation of predetermined size, so that predetermined uniformity of distribution of reactants through the contact material will be substantially maintained as the operation of the apparatus continues, and foraminous or screen-like members located adjacent the perforation or perforations in each of said inserts and adapted to hold contact or catalytic mass away from said perforation or perforations and from the walls adjacent said perforations so as in effect to provide chambers along the walls of the conduit adjacent each of said perforations of much greater extent than the dimensions of said perforations in order to increase substantially the surface of contact material through which fluid commences diffusing or from which it leaves such mass so as substantially to eliminate non-uniformity of flow through various portions of the reaction chamber because of variations in the porosity of the small sections of contact material directly over each perforation or opening.

5. In combination, a converter providing a reaction chamber for effecting a contact or catalytic treatment of fluids, a series of induction conduits and a series of eduction conduits extending within said reaction chamber in interspersed and substantially symmetrical and parallel relation and adapted to be embedded in a bed of contact material, the conduits of both said series having perforations or openings in the walls thereof spaced from each other along the lengths of said conduits and arranged to provide for substantially uniform introduction of fluids into and withdrawal of fluids from all portions of the reaction chamber containing contact material, corrosion and erosion resistant metal alloy inserts mounted in said openings, each having at least one perforation of predetermined size, thereby to maintain the predetermined size of each of said openings for the passing of fluids substantially constant, and foraminous or screen-like members located adjacent the perforation or perforations in each of said inserts, each of said screen-like members being attached to an insert adjacent its circumference or periphery and adapted to hold contact material away from said perforation or perforations and from the surfaces of the inserts adjacent said perforations so as in effect to provide chambers along the walls of the conduits adjacent each of said perforations of much greater extent than the dimensions of said perforations, thereby to increase substantially the surface of contact material through which fluid commences diffusing or from which it leaves said bed so as substantially to eliminate non-uniformity of flow through various portions of the reaction chamber because of variations in the porosity of the small sections of contact material directly over each perforation or opening.

6. The combination of a contact mass, a fluid distributing member having a plurality of perforations therein embedded in said mass, a fluid outlet member having a plurality of perforations therein embedded in said mass and in spaced relation with said distributing member, an insert having a perforation therethrough mounted in the perforations of each of said members, the perforations in the inserts in said distributing member flaring inwardly toward the interior of said member, and the perforation in said outlet member flaring outwardly toward said mass.

7. In combination, a contact mass, a fluid distributing member comprising perforated inner and outer conduits in nested relation embedded in said mass, a perforated fluid outlet member embedded in said mass and in spaced relationship with said distributing member, an insert having a perforation therethrough mounted in each of the perforations in said inner and outer conduits of said distributing member and in each of the perforations in said outlet member, the perforations in the inserts in said inner conduit flaring toward the interior thereof and toward said outer conduit, the perforations in the inserts in said outer conduit flaring toward said inner conduit, and the perforations in the inserts in said outlet member flaring outwardly toward said mass.

EUGENE HOUDRY.
RAYMOND C. LASSIAT.